United States Patent Office 2,711,487
Patented June 21, 1955

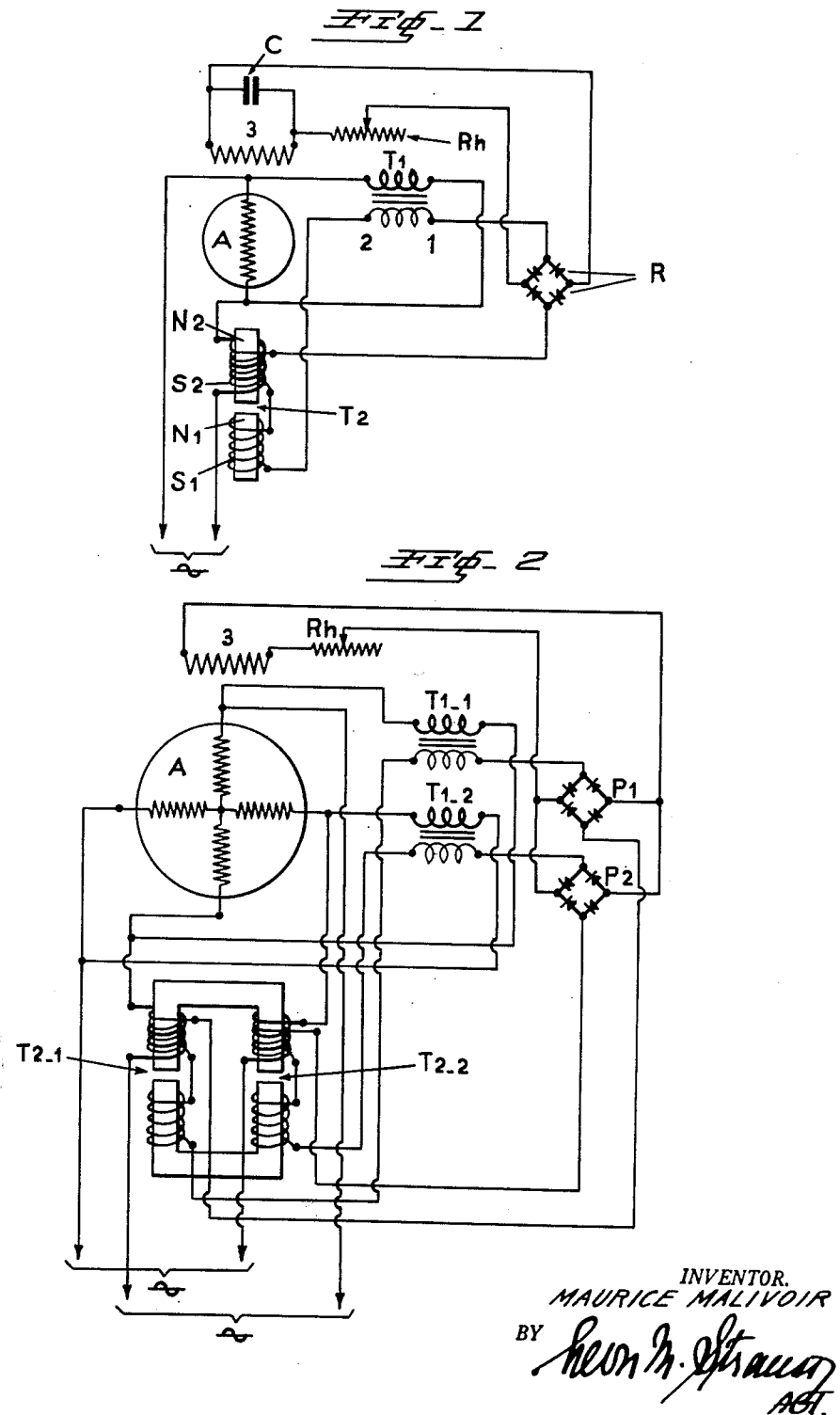

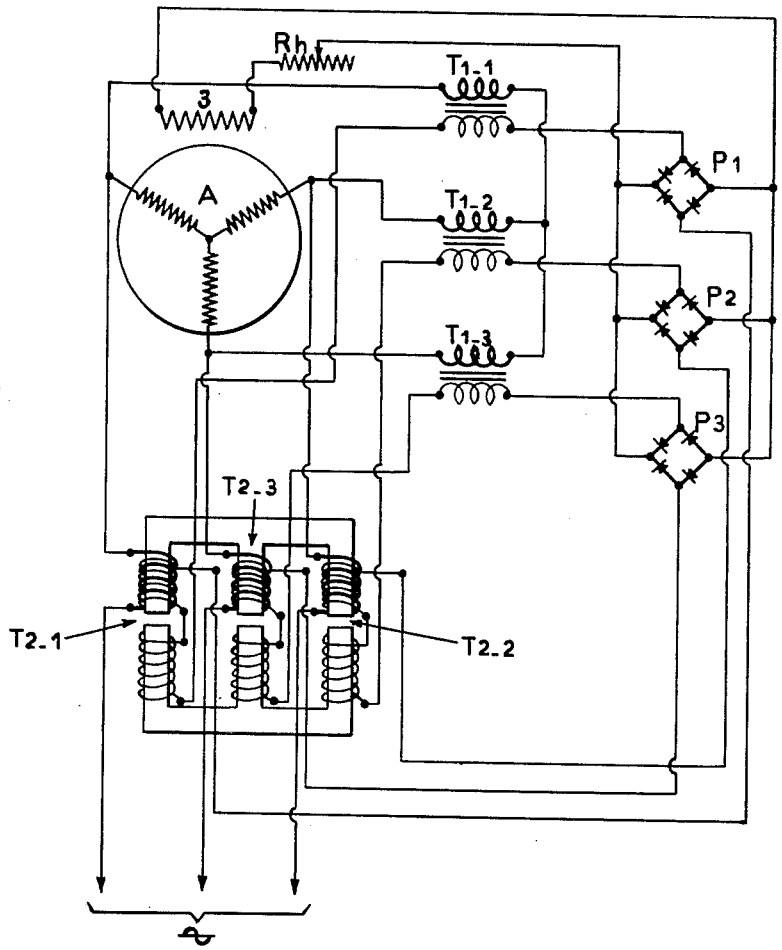

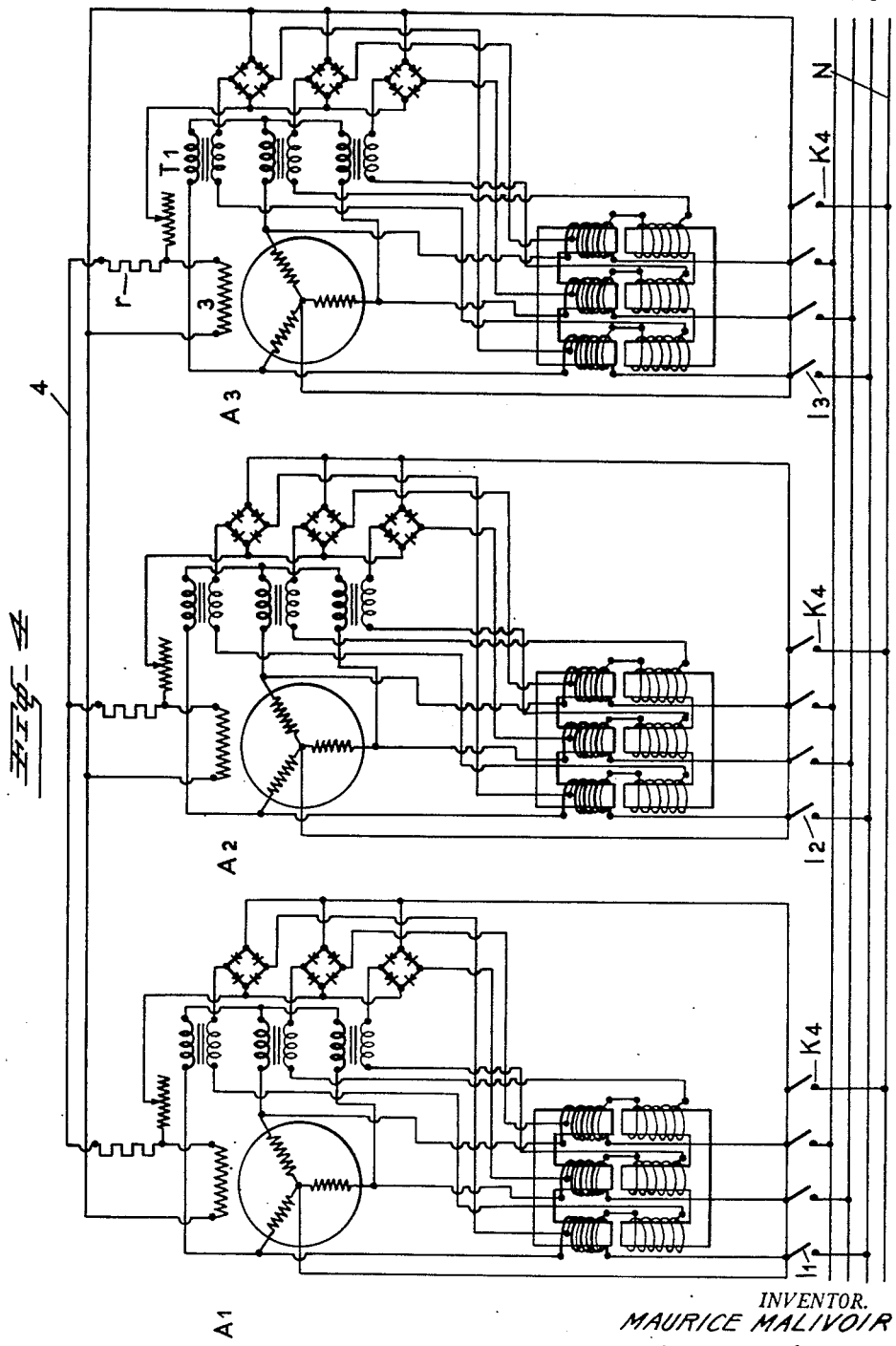

2,711,487

STATIC ALTERNATOR EXCITATION AND
SELF-REGULATING DEVICE

Maurice Malivoir, Pierrefitte, Seine, France, assignor to Etablissements Aubry et Simonin, a French society Application January 30, 1951, Serial No. 208,473

Claims priority, application France August 3, 1950

4 Claims. (Cl. 307—84)

This invention relates generally to excitation systems for alternating current generators or alternators.

At present alternators are excited through exciter dynamos together with voltage regulators. Such rotating aggregates due to their inertia cannot respond instantaneously to load variations; they are also expensive and subject ot wear; moreover the carbons and collectors get often out of order, thereby requiring repeated maintenance.

It is an object of the present invention to provide static alternator excitation and self-regulation means avoiding the abovementioned and other drawbacks.

This invention contemplates in particular a purely static alternator excitation and self-regulation device and has as one of its objects to provide static rectifiers (preferably of the dry type) supplying the exciting circuit of the alternator and a circuit fed by a portion of the current delivered by the alternator, which supplies said rectifiers with said current portion, whereby the value of the alternating voltage supplied to the rectifiers is a function of the alternator load.

More particularly, it is an object of this invention to provide static alternator excitation and self-regulation means including, for each phase, a rectifier bridge, a diagonal thereof being connected to the secondary winding of a voltage transformer having its primary winding connected across the output circuit of the alternator.

It is also an object of the invention to provide a static alternator excitation and self-regulation device in which each phase comprises an auxiliary intensity transformer, the primary winding thereof being series connected with the alternator output circuit, and the secondary winding being series connected with the secondary of voltage transformer corresponding to the same phase. The function of said auxiliary transformer is to ensure the self-regulation of the excitation in respect to the load. In a preferred embodiment said intensity transformer is of the open circuit type and comprises two secondary windings respectively wound on two separate magnetic cores in the same direction or in opposition as needed, in order to provide, under load, the supplementary voltage required for the excitation. Owing to this improved arrangement, the resultant action of the two secondary elements provides a compounding curve which corresponds to the alternator excitation curve and enables the drop of voltage resulting from the speed loss, under load, of the drive machine to be overcome.

The aforesaid and other objects, features and advantages of the invention will be more easily and fully understood from the illustration of the following embodiments of a static alternator excitation and self-regulation device according to the invention, it being understood that the invention is not restricted to the details of the illustrated and described embodiments but that it is susceptible to modifications and adaptations.

In the attached drawings:

Fig. 1 shows diagrammatically the device according to the invention adapted to a single-phase alternator.

Fig. 2 shows also diagrammatically the device according to the invention adapted to a two-phase alternator.

Fig. 3 shows diagrammatically the device adapted to a three-phase alternator; and Fig. 4 is a diagram illustrating the parallel coupling of several three-phase alternators, each one provided with static excitation devices according to the invention.

In Fig. 1, A is a diagrammatic representation of a single-phase alternator armature winding. The primary winding of a voltage transformer $T_1$ is in parallel with said armature winding A, a terminal 1 of the secondary transformer winding being connected with the terminal of one of the diagonals of a Wheatstone bridge P, comprising in each of its arms a static rectifier R, preferably of the dry type. The terminal 2 of the secondary transformer winding is connected to the other terminal of the same bridge diagonal through the secondary winding of an auxiliary intensity or current transformer $T_2$ having its primary winding series connected with the alternator output circuit. This last-mentioned primary winding comprises only a few turns thereby reducing to a minimum the drop of voltage in said output circuit.

The other rectifier bridge diagonal supplies the alternator excitation circuit (the winding of said circuit having the reference numeral 3 in the drawings). A rheostat Rh, series wound in this last mentioned circuit, adjusts the excitation voltage at the convenient value thereof and also imparts to the device the desired stability.

The transformer $T_1$ is so designed as to supply the rectifiers R with the alternating voltage necessary for exciting the alternator in no-load condition considering the drop of voltage in the rheostat Rh. The transformer $T_2$ supplies the rectifiers with the additional voltage for the alternator running under load. An efficient regulation is ensured for any load and power factor by providing with an open magnetic circuit the transformer $T_2$, which includes two different cores $N_1$ and $N_2$ on which are coiled the two parts $S_1$ and $S_2$, respectively, supplying the active current and the reactive current (wattfull and watless components). The relative size of the parts or elements $S_1$ and $S_2$ is determined by the additional voltage which must be supplied for any power factor to the excitation circuit 3 of the alternator under load and by the curve showing the variation of the additional voltage as function of the load.

A condenser C is disposed between the terminals of the excitation circuit 3 and the introduced delay smoothes out the residual pulsations of the rectified current providing a substantially steady direct current.

Figs. 2 and 3 illustrate a device according to the invention for use in connection with a two-phase and a three-phase alternator, respectively.

If the load is substantially balanced, a single-phase open-circuit intensity transformer can be used, the various rectifier bridges being parallelly connected to the excitation winding 3. More generally however the compounding should be realised on each phase as shown in the drawings.

No full description of the circuits shown in Figs. 2 and 3 are given here as said circuits are similar to the one shown in Fig. 1 and which was fully described. But it is noteworthy that the partial overlapping of the rectified pulsations originated from the various phases supplies a rectified current having a very low residual pulsation, thereby avoiding the need of a condenser (as the condenser C of Fig. 1) parallelly connected to the excitation circuit 3.

Also noteworthy is the proportionality of the voltage which supplies the rectifiers both to the current leaving the alternator and to the phase difference between last mentioned current and the corresponding voltage, proportionately satisfying the balancing condition of alternator armature reaction. On the other hand, since the rectifier bridges supply in parallel the excitation winding 3, the unbalances between phases are automatically compensated.

It will be understood that the voltage transformer $T_1$ may be dispensed with for a convenient excitation voltage in no-load condition of the alternator. If this excitation voltage is inferior to the voltage supplied by the alternator, it is nevertheless possible to delete the voltage transformers $T_1$ in a variant embodiment, by supplying the voltage to the rectifiers from an auxiliary tapping provided in the armature windings.

Lastly, it is possible to adjust the coefficient of mutual induction between the $T_2$ intensity transformer windings by judiciously determining relative position thereof. By suitably selecting the turns in the primary and secondary windings of the $T_2$ transformers a hypercompounding or an anticompounding effect can be easily obtained.

In Fig. 4 is shown a parallel coupling of alternators provided with a static excitation device according to the invention. This coupling is used for alternators having an ascending load characteristic; if the load characteristic is a descending curve, there are indeed no circulating currents between the alternators.

In order to suppress these circulating currents, which may exist, even in no-load conditions, and according to the invention, the armature windings on the one hand and the inductors on the other hand are parallelly connected.

The parallel coupling of the armatures is easily performed with the contactors $I_1$, $I_2$, $I_3$ which connect the windings to the line cables.

For the inductors a common wire 4 connects in parallel one terminal of the windings 3 and a second common wire to which may be connected the other terminal of the windings through a supplementary contactor $K_4$ locked to the corresponding I contactor axle. In the embodiment shown in Fig. 4, concerning three-phase alternators, the second supplementary wire is a neutral conductor N.

But as voltage differences may exist at the various inductor terminals the set of alternators is balanced through resistances $r$ series disposed between each inductor 3 and the common wire 4. These resistances may be made adjustable, thereby allowing the adjustment thereof to the desired values.

It can thus be seen that in accordance with the present invention there has been provided a static self-regulating excitation device for a three-phase alternator having a direct current field winding and an armature winding delivering energy to an output circuit, comprising rectifier means connected to said field winding for supplying direct current thereto, a three-phase current transformer provided with three primary windings, a three-phase voltage transformer provided with three primary windings, both of said transformers being supplied by said armature winding and supplying said rectifier means, each primary winding of said voltage transformer being connected at a point forming the junction of the respective primary winding of said current transformer and the respective armature winding of the corresponding phase of said output circuit, the magnetic circuit of said current transformer being of the open-circuit type.

The invention is not restricted to the specific illustrated embodiment, but is subject to modifications and adaptations which will occur to those skilled in the art, and it should be understood that protection is sought for the invention as covered by the spirit and the language of the attached claims.

Having thus described the invention, what is claimed as new and desired to be secured by Letters Patent, is:

1. A static self-regulating excitation device for a three-phase alternator having a direct current field winding and an armature winding delivering energy to an output circuit, comprising rectifier means connected to said field winding for supplying direct current thereto, a three-phase current transformer provided with three primary windings, a three-phase voltage transformer provided with three primary windings, both of said transformers being supplied by said armature winding and supplying said rectifier means, each primary winding of said voltage transformer being connected at a point forming the junction of the respective primary winding of said current transformer and the respective armature winding of the corresponding phase of said output circuit, the magnetic circuit of said current transformer being of the open-circuit type.

2. A static self-regulating excitation device for a three-phase alternator having a direct current field winding and an armature winding delivering energy to an output circuit, comprising rectifier means connected to said field winding for supplying direct current thereto, a three-phase current transformer provided with three primary windings, a three-phase voltage transformer provided with three primary windings, both of said transformers being supplied by said armature winding, and supplying said rectifier means, each primary winding of said voltage transformer being connected at a point forming the junction of the respective primary winding of said current transformer and the respective armature winding of the corresponding phase of said output circuit, the magnetic circuit of said current transformer being of the open-circuit type, said direct current field winding being provided with a rheostat for variably adjusting the excitation voltage to a given predetermined value.

3. A parallel coupling of a set of multi-phase alternators provided with a static self-regulating excitation device as set forth in claim 1, wherein the field circuits of said set of alternators are connected in parallel, thereby suppressing circulating currents.

4. A parallel coupling of a set of multi-phase alternators provided with a static self-regulating excitation device as set forth in claim 2, wherein the field circuits of said set of alternators are connected in parallel, thereby suppressing circulating currents.

References Cited in the file of this patent

UNITED STATES PATENTS

| | | |
|---|---|---|
| 2,146,779 | Swanson | Feb. 14, 1939 |
| 2,208,416 | Friedlander et al. | July 16, 1940 |
| 2,454,582 | Thompson et al. | Nov. 23, 1948 |
| 2,549,250 | Sikorra et al. | Apr. 17, 1951 |

FOREIGN PATENTS

| | | |
|---|---|---|
| 706,650 | Germany | May 31, 1941 |